(12) United States Patent
Park et al.

(10) Patent No.: US 12,119,488 B2
(45) Date of Patent: Oct. 15, 2024

(54) POSITIVE ELECTRODE ACTIVE MATERIAL FOR LITHIUM SECONDARY BATTERY AND LITHIUM SECONDARY BATTERY

(71) Applicant: LG Chem, Ltd., Seoul (KR)

(72) Inventors: Na Ri Park, Daejeon (KR); Yeo June Yoon, Daejeon (KR); Sung Ho Ban, Daejeon (KR); Jun Ho Eom, Daejeon (KR); Hyeon Hui Baek, Daejeon (KR); Ki Cheol Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 799 days.

(21) Appl. No.: 15/734,056

(22) PCT Filed: Jun. 19, 2019

(86) PCT No.: PCT/KR2019/007400
§ 371 (c)(1),
(2) Date: Dec. 1, 2020

(87) PCT Pub. No.: WO2019/245284
PCT Pub. Date: Dec. 26, 2019

(65) Prior Publication Data
US 2021/0226205 A1    Jul. 22, 2021

(30) Foreign Application Priority Data
Jun. 20, 2018 (KR) .................. 10-2018-0071054

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/505* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2009/0117469 A1    5/2009  Hiratsuka et al.
2011/0206988 A1    8/2011  Tanaka et al.
(Continued)

FOREIGN PATENT DOCUMENTS

CN     102971892 A      3/2013
DE     112012006167 T5  12/2014
(Continued)

OTHER PUBLICATIONS

KR20170063407A (machine translation), original publication date Jun. 8, 2017 (Year: 2017).*
(Continued)

*Primary Examiner* — Brian R Ohara
*Assistant Examiner* — Michelle T Leonard
(74) *Attorney, Agent, or Firm* — Lerner David LLP

(57) ABSTRACT

Provided is a lithium secondary battery including a positive electrode, a negative electrode, a separator interposed between the positive electrode and the negative electrode, and an electrolyte, wherein the positive electrode includes, as a positive electrode active material, a lithium composite transition metal oxide powder having a layered structure and a nickel content accounting for 50 atm % or more of total transition metals, and wherein the layered structure of the positive electrode active material is phase-transformed into a spinel structure at a temperature of 300° C. or more in a fully charged state.

3 Claims, 2 Drawing Sheets

(51) Int. Cl.
*H01M 4/505* (2010.01)
*H01M 10/0525* (2010.01)

(56) References Cited

U.S. PATENT DOCUMENTS

| | | |
|---|---|---|
| 2011/0311869 A1 | 12/2011 | Oh et al. |
| 2013/0224585 A1 | 8/2013 | Oh et al. |
| 2015/0072232 A1 | 3/2015 | Nagai |
| 2015/0380736 A1 | 12/2015 | Park et al. |
| 2016/0013476 A1 | 1/2016 | Oh et al. |
| 2016/0293951 A1 | 10/2016 | Lim et al. |
| 2017/0069910 A1 | 3/2017 | Harada et al. |
| 2017/0263920 A1 | 9/2017 | Choi et al. |
| 2018/0006294 A1* | 1/2018 | Lee ................. H01M 4/133 |
| 2018/0233739 A1 | 8/2018 | Park et al. |
| 2018/0351169 A1 | 12/2018 | Oh et al. |

FOREIGN PATENT DOCUMENTS

| | | |
|---|---|---|
| EP | 3282506 A1 | 2/2018 |
| EP | 3333961 A1 | 6/2018 |
| JP | 2012121805 A | 6/2012 |
| JP | 5489723 B2 | 5/2014 |
| JP | 2015-156363 A | 8/2015 |
| JP | 2015536558 A | 12/2015 |
| JP | 6202205 B2 | 9/2017 |
| JP | 2018037393 A | 3/2018 |
| KR | 20120084585 A | 7/2012 |
| KR | 20130031079 A | 3/2013 |
| KR | 20150050458 A | 5/2015 |
| KR | 20150102405 A | 9/2015 |
| KR | 20160002200 A | 1/2016 |
| KR | 20160026306 A | 3/2016 |
| KR | 20160075404 A | 6/2016 |
| KR | 20160083638 A | 7/2016 |
| KR | 20170008164 A | 1/2017 |
| KR | 20170063407 A * | 6/2017 ......... H01M 10/052 |
| KR | 20170063420 A | 6/2017 |
| KR | 20170075596 A | 7/2017 |
| KR | 20170106810 A | 9/2017 |
| WO | 2017095152 A1 | 6/2017 |

OTHER PUBLICATIONS

"Ionic Radii in Crystals" table in CRC Handbook of Chemistry and Physics, 104th edition (Internet Version 2023), Chapter 11, pp. 1-3, CRC Press, Taylor & Francis Group, Boca Raton, FL. (Year: 2023).*

Extended European Search Report including Written Opinion for Application No. 19822422.2 dated May 27, 2021, pp. 1-8.

International Search Report for Application No. PCT/KR2019/007400 mailed Sep. 23, 2019, 2 pages.

* cited by examiner

[FIG. 1]
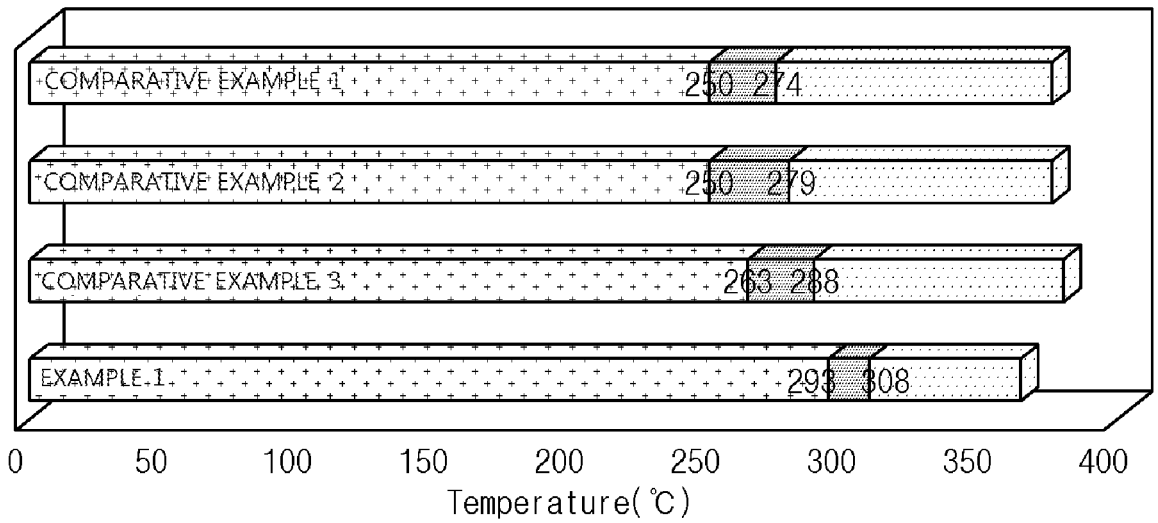
[FIG. 2]
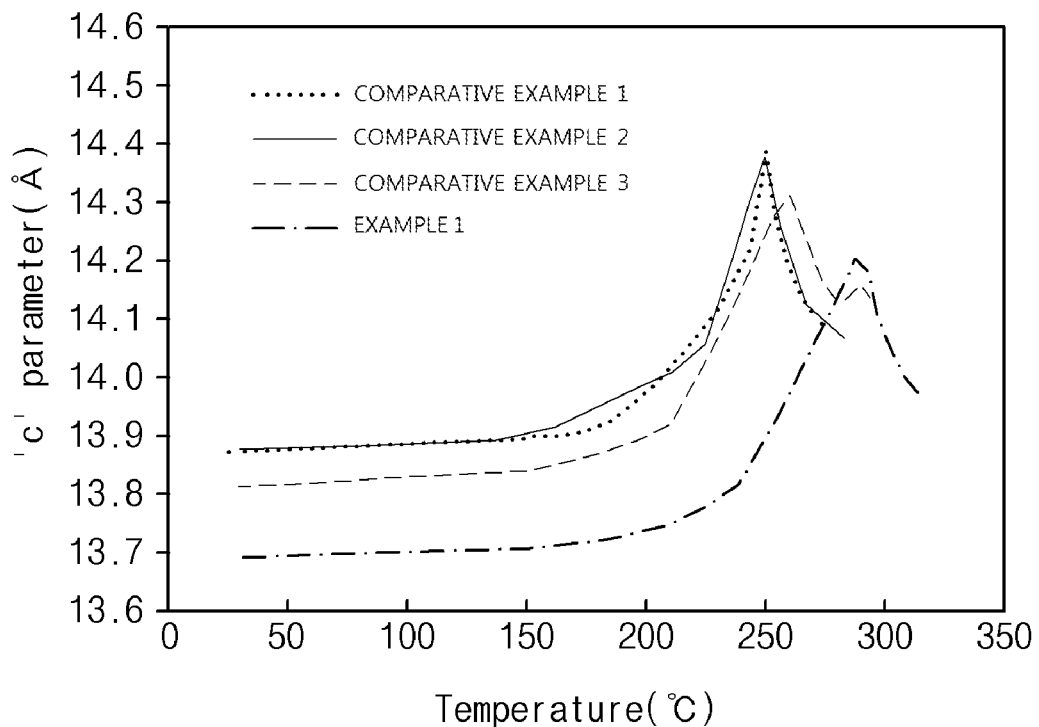

[FIG. 3]
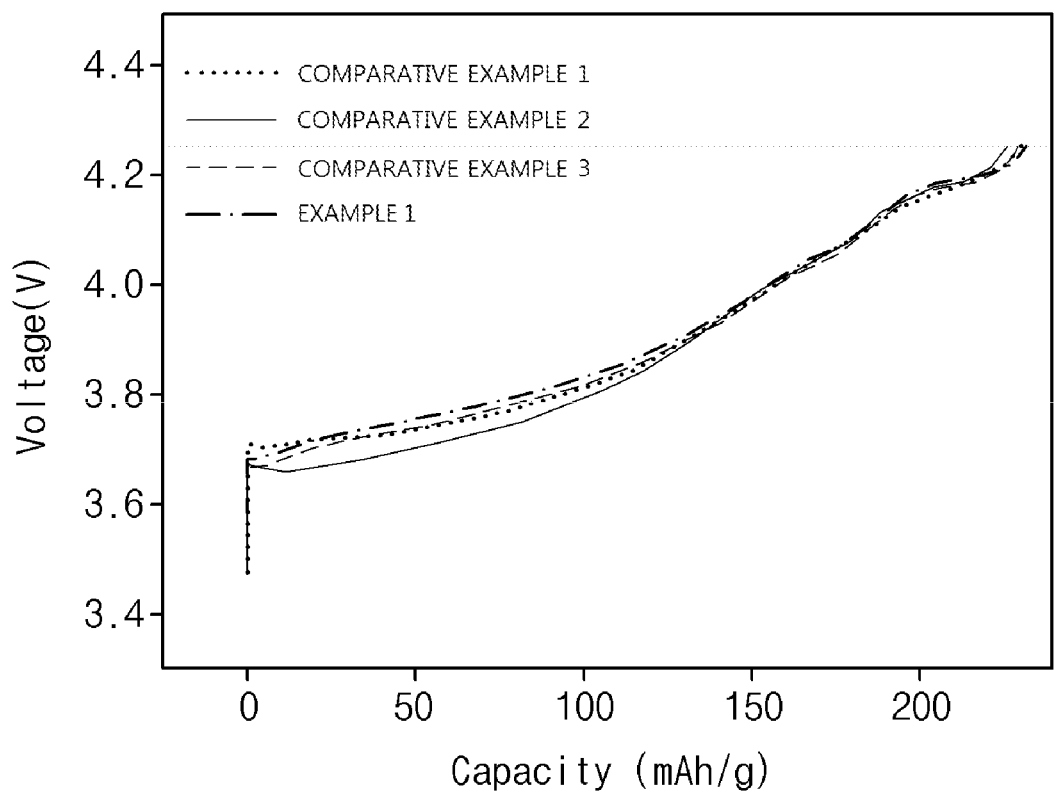

POSITIVE ELECTRODE ACTIVE MATERIAL FOR LITHIUM SECONDARY BATTERY AND LITHIUM SECONDARY BATTERY

CROSS-REFERENCE TO RELATED APPLICATION

This application is a national phase entry under 35 U.S.C. § 371 of International Application No. PCT/KR2019/007400, filed on Jun. 19, 2019, which claims priority to Korean Patent Application No. 10-2018-0071054, filed on Jun. 20, 2018, the disclosures of which are incorporated herein by reference in their entirety.

TECHNICAL FIELD

The present invention relates to a lithium secondary battery, and more particularly, to a lithium secondary battery having excellent capacity characteristics and excellent thermal stability.

BACKGROUND ART

Recently, as environmental issues have emerged as important issues, the interest in renewable energy that can replace nuclear power generation or fossil fuels has increased. Among such renewable energy, the demand for secondary batteries which allow charging and discharging and thus have semi-permanent characteristics and allow for repeated use is growing rapidly.

Lithium secondary batteries are the most noticeable secondary batteries due to having excellent lifetime (cycle) characteristics and high energy density. As a positive electrode active material for such a lithium secondary battery, various lithium transition metal oxides such as $LiCoO_2$, $LiNiO_2$, $LiMnO_2$, $LiMn_2O_4$, $LiFePO_4$, $Li(Ni_aCo_bMn_c)O_2$ (here, a, b and c are the atomic fractions of transition metals, wherein $0<a<1$, $0<b<1$, $0<c<1$, and $a+b+c=1$; this compound is hereinafter referred to as an NCM-based lithium oxide) and the like have been developed. Meanwhile, in recent years, for application to high-capacity batteries such as batteries for electric vehicles, the development of nickel (Ni)-rich NCM-based lithium oxides with an increased high-energy-density nickel content is actively ongoing.

However, in the case of Ni-rich NCM-based lithium oxides having a nickel content of 50 atm % or more, although an excellent effect is provided in terms of capacity implementation, since the structural stability and chemical stability of the active material decrease with an increasing nickel content, problems such as repeated charging and discharging degrading the structural integrity of an active material surface, battery stability being lowered due to the occurrence of an exothermic reaction entailing the rapid degradation of structural integrity, or lifetime characteristics being rapidly degraded due to structural deterioration may occur. Such a phenomenon is aggravated under a high-temperature condition. In addition, compared to positive electrode active materials having a low nickel content, a positive electrode active material having a nickel content accounting for 80 atm % or more of total transition metals has the problem that lifetime characteristics are further degraded at high temperature as cation mixing, irreversible phase transformation and the like are accelerated.

In order to address the above-described problems, techniques that improve the structural stability of a positive electrode active material through doping with a metal element have been attempted. However, the positive electrode active materials proposed to date have problems such as the effect of improving thermal structural stability not being sufficient, the capacity being decreased due to a doping element, and resistance (lifetime characteristic) being increased at high temperatures.

DISCLOSURE

Technical Problem

The present invention is directed to providing a lithium secondary battery which has high-capacity characteristics, undergoes a small reduction in capacity due to the inclusion of a positive electrode active material having excellent thermal structural stability, and exhibits excellent electrochemical properties at high temperatures.

Technical Solution

One aspect of the present invention provides a lithium secondary battery which includes a positive electrode, a negative electrode, a separator interposed between the positive electrode and the negative electrode, and an electrolyte, wherein the positive electrode includes, as a positive electrode active material, a lithium composite transition metal oxide powder having a layered structure and a nickel content accounting for 50 atm % or more of total transition metals, and wherein the layered structure of the positive electrode active material is phase-transformed into a spinel structure at a temperature of 300° C. or more in a fully charged state.

In addition, when a c parameter of the positive electrode active material in a fully charged state is measured while raising a temperature to 350° C., a maximum value of the c parameter may be obtained at a temperature of 280° C. to 320° C.

In this case, based on the total weight of the lithium composite transition metal oxide, the first doping element may be included in an amount of 500 to 4,000 ppm, and the second doping element may be included in an amount of 800 to 6,000 ppm.

More preferably, the lithium composite transition metal oxide may include Ti and W as doping elements.

Specifically, the lithium composite transition metal oxide may be represented by the following Chemical Formula 1.

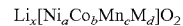   [Chemical Formula 1]

In Chemical Formula 1, M includes one or more elements selected from the group consisting of Ti, Cr, V, Fe, Zn, Cu and Mg and one or more elements selected from the group consisting of Nb, Ta, W and Mo, and $0.98 \le x \le 1.2$, $0.50 \le a \le 0.99$, $0 \le b < 0.40$, $0 < c < 0.40$, and $0 < d < 0.20$.

In addition, the lithium composite transition metal oxide may include, on a surface thereof, a coating layer including one or more elements selected from the group consisting of Al, Ti, W, B, F, P, Mg, Ni, Co, Fe, Cr, V, Cu, Ca, Zn, Zr, Nb, Mo, Sr, Sb, Bi, Si and S.

Another aspect of the present invention provides a positive electrode active material for a lithium secondary battery, the positive electrode active material including a lithium composite transition metal oxide powder having a layered structure and a nickel content accounting for 50 atm % or more of total transition metals, wherein the layered structure of the positive electrode active material is phase-transformed into a spinel structure at a temperature of 300° C. or more in a fully charged state.

Advantageous Effects

Due to the inclusion of a positive electrode active material that has excellent capacity characteristics due to containing a large amount of nickel accounting for 50 atm % or more of total transition metals and has a high crystal phase transformation temperature in a fully charged state, the lithium secondary battery of the present invention can exhibit excellent electrochemical properties such as a minimized reduction in discharge capacity and a small increase in resistance at high temperatures.

DESCRIPTION OF DRAWINGS

FIG. 1 is a graph illustrating a change in the crystal structure of the positive electrode active materials of Example 1 and Comparative Examples 1 to 3 according to temperature, wherein the positive electrode active materials are in a fully charged state.

FIG. 2 is a graph illustrating a change in the c parameter of the positive electrode active materials of Example 1 and Comparative Examples 1 to 3 according to temperature, wherein the positive electrode active materials are in a fully charged state.

FIG. 3 is a graph illustrating an initial charge capacity of the lithium secondary batteries of Example 1 and Comparative Examples 1 to 3.

BEST MODE

Hereinafter, the present invention will be described in more detail.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present specification, a particle diameter Dn refers to a particle diameter corresponding to an n % point in a particle number cumulative distribution by particle diameter. That is, D50 is the particle diameter corresponding to a 50% point in the particle number cumulative distribution by particle diameter, D90 is the particle diameter corresponding to a 90% point in the particle number cumulative distribution by particle diameter, and D10 is the particle diameter corresponding to a 10% point in the particle number cumulative distribution by particle diameter. The Dn may be determined using a laser diffraction method. Specifically, a powder to be analyzed is dispersed in a dispersion medium, and the dispersion is introduced into a commercially available laser diffraction particle size measuring instrument (e.g., Microtrac S3500) in which a particle size distribution is obtained by measuring a change in diffraction pattern according to a particle size while particles are passed through a laser beam. By calculating the particle diameters corresponding to the 10%, 50% and 90% points in the particle number cumulative distribution by particle diameter obtained by the measuring instrument, the D10, the D50 and the D90 can be determined.

As a result of prolonged research to develop a lithium secondary battery having excellent high-temperature characteristics while exhibiting a minimized reduction in discharge capacity and a minimized increase in resistance at high temperatures, the inventors of the present invention have found that the objective is achievable by using a positive electrode active material including a lithium composite transition metal oxide which has a layered structure and a nickel content accounting for 50 atm % or more of total transition metals and the layered structure of which is phase-transformed into a spinel structure at a temperature of 300° C. or more in a fully charged state, and thereby completed the present invention.

Conventionally, it has been common to analyze crystals of a positive electrode active material by an X-ray diffraction (XRD) method. However, since a positive electrode active material in a charged state is very unstable due to loss of lithium, with the conventional method, it has not been able to accurately measure a change in the crystal structure of a positive electrode active material in a charged state.

Hence, the inventors of the present invention measured a change in the crystal structure of a charged positive electrode active material according to temperature by obtaining high resolution powder diffraction (hereinafter abbreviated as HRPD) data using synchrotron radiation, and thereby found that the capacity characteristics and high-temperature resistance characteristics of a lithium secondary battery were affected by the temperature at which the crystal structure of a fully-charged positive electrode active material was phase-transformed.

Lithium composite transition metal oxides having a layered crystal structure have a form in which a lithium layer and a transition metal layer are alternately stacked, and when charging, the crystal structure becomes unstable as the lithium is deintercalated and released from the lithium layers. When exposed to high temperatures in such an unstable state, the crystal structure undergoes phase transformation, in which case, the passages through which lithium ions migrate are blocked, resulting in lowered lithium mobility and accordingly in the degradation of electrochemical properties such as capacity and resistance characteristics. Such a change in crystal structure is irreversible and cannot be recovered.

Therefore, in the present invention, the high-temperature performance of the lithium secondary battery is improved by using the positive electrode active material having the layered structure which is phase-transformed into a spinel structure at a temperature of 300° C. or more in a fully charged state.

Meanwhile, according to the research conducted by the inventors of the present invention, even among positive electrode active materials of similar compositions, the temperature that caused a change in the crystal structure in a fully charged state was different depending on the type of doping element(s), particle size, particle size distribution or the like. That is, the crystal structure phase transformation temperature of a positive electrode active material in a fully charged state is determined by a combination of the composition of the lithium composite transition metal oxide, types of doping and coating elements, particle size, particle size distribution and the like, and not by a single factor.

The crystal structure phase transformation temperature of a positive electrode active material in a fully charged state may be measured, for example, by the following method.

First, a coin-type half-cell is fabricated by interposing a separator between a positive electrode including a positive electrode active material to be analyzed and a lithium metal negative electrode. The coin-type half-cell fabricated as such is fully charged. Subsequently, the coin-type half-cell is disassembled to separate the positive electrode therefrom. The positive electrode active material layer is scraped off from the separated positive electrode so that a positive electrode active material sample in a fully charged state can be obtained. Then, the sample is placed in an in-situ high-temperature XRD measuring instrument using synchrotron radiation so that XRD data according to temperature can be obtained, and by analyzing the data, the crystal structure of the positive electrode active material according to temperature is determined.

More specifically, the lithium secondary battery of the present invention includes a positive electrode, a negative electrode, a separator interposed between the positive electrode and the negative electrode, and an electrolyte, wherein the positive electrode includes, as a positive electrode active material, a lithium composite transition metal oxide powder having a layered structure and a nickel content accounting for 50 atm % or more of total transition metals, and wherein the layered structure of the positive electrode active material is phase-transformed into a spinel structure at a temperature of 300° C. or more in a fully charged state.

Hereinafter, each component of the present invention will be described in detail.

(1) Positive Electrode

The positive electrode of the present invention includes a positive electrode active material layer, and the positive electrode active material layer includes, as a positive electrode active material, a lithium composite transition metal oxide powder having a layered structure and a nickel content accounting for 50 atm % or more of total transition metals.

In this case, the lithium composite transition metal oxide powder preferably includes one or more types of doping elements.

Examples of the first doping element include Ti, Cr, V, Fe, Zn, Cu, Mg and the like, and the first doping element is preferably Ti.

Meanwhile, the first doping element may be included in an amount of 500 to 4,000 ppm, preferably 1,000 to 3,000 ppm, based on the total weight of the lithium composite transition metal oxide. When the content of the first doping element satisfies the above-described range, the skeleton of the layered structure can be sufficiently supported by the first doping element, and therefore, the deformation of the crystal structure during repeated charging and discharging can be suppressed. As a result, the phase transformation of the crystal structure can be delayed as much as possible, and the effect of improving the thermal and physical structural stability of the positive electrode active material can be provided.

Examples of the second doping element include Nb, Ta, W, Mo and the like, and the second doping element is preferably W.

The second doping element may be included in an amount of 800 to 6,000 ppm, preferably 1,000 to 5,000 ppm, based on the total weight of the lithium composite transition metal oxide. When the content of the second doping element satisfies the above-described range, since the primary particle growth of the positive electrode active material can be controlled, production efficiency, positive electrode active material density and the like are increased, and it is possible to secure not only electrochemical properties but also excellent physical properties by using the second doping element in the development of a positive electrode active material having high capacity and high density.

Preferably, the lithium composite transition metal oxide includes both the first doping element and the second doping element. It has been found that when the lithium composite transition metal oxide includes both the first doping element and the second doping element, a decrease in discharge capacity due to a doping element is reduced and high-temperature lifetime characteristics are improved.

Most preferably, the lithium composite transition metal oxide includes Ti and W as doping elements. When the above-described combination is used as a doping element, the effect of improving high-temperature structural stability and preventing a reduction in capacity is most excellent.

More specifically, the lithium composite transition metal oxide may be represented by the following Chemical Formula 1.

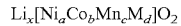   [Chemical Formula 1]

In Chemical Formula 1, M is a doping element substituted at transition metal sites, and may include, for example, one or more elements selected from the group consisting of Ti, Cr, V, Fe, Zn, Cu and Mg and one or more elements selected from the group consisting of Nb, Ta, W and Mo. Preferably, M includes Ti and W.

x represents the atomic fraction of lithium in the lithium composite transition metal oxide, and may be $0.98 \leq x \leq 1.2$, preferably $1.0 \leq x \leq 1.2$, more preferably $1.02 \leq x \leq 1.08$.

a represents the atomic fraction of nickel in the lithium composite transition metal oxide, and may be $0.50 \leq a \leq 0.99$, preferably $0.60 \leq a \leq 0.95$, more preferably $0.80 \leq a \leq 0.95$, even more preferably $0.85 \leq a \leq 0.95$. When nickel is included in a large amount as such, excellent capacity characteristics can be attained.

b represents the atomic fraction of cobalt in the lithium composite transition metal oxide, and may be $0 \leq b < 0.40$, preferably $0 \leq b \leq 0.30$, more preferably $0 \leq b \leq 0.20$, even more preferably $0 \leq b \leq 0.15$.

c represents the atomic fraction of manganese in the lithium composite transition metal oxide, and may be $0 < c < 0.40$, preferably $0 < c \leq 0.30$, more preferably $0 < c \leq 0.20$, even more preferably $0 < c \leq 0.15$.

d represents the atomic fraction of the doping element M in the lithium composite transition metal oxide, and may be $0 < d < 0.20$, preferably $0 < d \leq 0.15$.

Meanwhile, the lithium composite transition metal oxide may include, on a surface thereof, a coating layer including one or more elements selected from the group consisting of Al, Ti, W, B, F, P, Mg, Ni, Co, Fe, Cr, V, Cu, Ca, Zn, Zr, Nb, Mo, Sr, Sb, Bi, Si and S. When such a coating layer is included, since the contact between a transition metal in the lithium composite transition metal oxide and an electrolyte is suppressed, a reduction in the structural stability of the lithium composite transition metal oxide due to a reaction with the electrolyte can be prevented. The coating layer preferably includes one or more selected from the group consisting of B, Al, W and Co, and most preferably includes B.

Meanwhile, the content of transition metal elements in the lithium composite transition metal oxide may be constant regardless of a position, or the content of one or more transition metal elements may vary depending on a position inside a particle. For example, the lithium composite transition metal oxide may have a concentration gradient in which the concentration of one or more components among Ni, Mn and Co gradually changes. Here, the "concentration gradient in which a concentration gradually changes" means that there is a concentration distribution in which the concentration of a component(s) continues to gradually change throughout either an entire particle or a specific region of a particle.

The positive electrode active material of the present invention which includes the above-described lithium composite transition metal oxide exhibits higher structural stability than conventional positive electrode active materials at high temperatures.

Unlike a general Ni-rich lithium composite transition metal oxide having the layered structure which is phase-transformed into a spinel structure at a temperature near 270° C. to 290° C. in a fully charged state, the layered structure of the positive electrode active material of the present invention is phase-transformed into a spinel structure at a high temperature of 300° C. or more in a fully charged state. Since the positive electrode active material of the present invention stably maintains the layered structure even at high temperatures as described above, when it is applied to a lithium secondary battery, stable lifetime characteristics and electrochemical properties can be exhibited even at high temperatures.

In addition, when the c parameter of the positive electrode active material of the present invention in a fully charged state is measured while raising a temperature to 350° C., a maximum value of the c parameter is obtained at a high temperature of about 280° C. to 320° C. In the case of a conventional Ni-rich lithium composite transition metal oxide, generally, when temperature is increased to at least 150° C. in a fully charged state, the positive electrode active material undergoes a structural change in which the c parameter inside thereof is rapidly increased, reaches a maximum in a temperature range of 250° C. to 280° C., and is rapidly decreased. Such a rapid structural change causes the lithium layers and the transition metal layers to move, and this causes the passages through which lithium migrates (i.e., lithium path) to be blocked and the performance of the lithium secondary battery to be degraded. On the other hand, in the case of the positive electrode active material of the present invention, the c parameter thereof is maintained relatively constant up to a temperature near 200° C. even in a fully charged state, and in addition, a maximum value of the c parameter is obtained at a high temperature of about 280° C. to 320° C. Therefore, when the positive electrode active material of the present invention is applied to a lithium secondary battery, stable lifetime characteristics and electrochemical properties can be exhibited at high temperatures.

Meanwhile, the c parameter of a fully charged positive electrode active material according to temperature may be measured by the same method as the above-described method of measuring a phase transformation temperature. That is, a coin-type half-cell is fabricated by interposing a separator between a positive electrode including a positive electrode active material to be analyzed and a lithium metal negative electrode. The coin-type half-cell fabricated as such is fully charged. Subsequently, the coin-type half-cell is disassembled to separate the positive electrode therefrom. The positive electrode active material layer is scraped off from the separated positive electrode so that a positive electrode active material sample in a fully charged state can be obtained. Then, the sample is placed in an in-situ high-temperature XRD measuring instrument using synchrotron radiation so that XRD data according to temperature can be obtained, and by analyzing the data, the c parameter of the positive electrode active material according to temperature can be determined.

The positive electrode active material may be included in an amount of 80 to 99 wt %, more specifically 85 to 98.5 wt %, based on the total weight of the positive electrode active material layer. When the content of the positive electrode active material satisfies the above-described range, excellent capacity characteristics can be exhibited.

Meanwhile, the positive electrode of the present invention may further include a conductive material and/or a binder in addition to the positive electrode active material in the positive electrode active material layer.

The conductive material is used to impart conductivity to the electrode, and may be used without particular limitation as long as it does not cause a chemical change in a battery being produced and has electron conductivity. Specific examples of the conductive material include: graphite such as natural graphite, artificial graphite or the like; a carbon-based material such as carbon black, acetylene black, Ketjen black, channel black, furnace black, lamp black, thermal black, carbon fiber or the like; a metal powder or metal fiber of copper, nickel, aluminum, silver or the like; a conductive whisker such as zinc oxide, potassium titanate or the like; a conductive metal oxide such as titanium oxide or the like; and a conductive polymer such as a polyphenylene derivative or the like, which may be used alone or in combination of two or more thereof. The conductive material may be included in an amount of 0.1 to 15 wt % based on the total weight of the positive electrode active material layer.

The binder serves to improve the adhesion between positive electrode active material particles and the adhesion between the positive electrode active material and a current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, styrene-butadiene rubber (SBR), fluororubber, various copolymers thereof and the like, which may be used alone or in combination of two or more thereof. The binder may be included in an amount of 0.1 to 15 wt % based on the total weight of the positive electrode active material layer.

The above-described positive electrode may be produced by a common method of producing a positive electrode, for example, by applying a positive electrode mixture prepared by dissolving or dispersing a positive electrode active material, a binder and/or a conductive material in a solvent onto a positive electrode current collector and then carrying out drying and rolling.

The solvent may be a solvent generally used in the art. Examples of the solvent include dimethyl sulfoxide (DMSO), isopropyl alcohol, N-methylpyrrolidone (NMP), acetone, water and the like, which may be used alone or in combination of two or more thereof. The usage amount of the solvent is not particularly limited, and is sufficient if it allows the viscosity of the positive electrode mixture to be appropriately adjusted considering the coating thickness, production yield, workability and the like of the positive electrode mixture.

Meanwhile, the positive electrode current collector is not particularly limited as long as it does not cause a chemical change in the battery and has conductivity. For example, stainless steel, aluminum, nickel, titanium, calcined carbon, or aluminum or stainless steel whose surface has been treated with carbon, nickel, titanium, silver or the like may be used. In addition, the positive electrode current collector may typically have a thickness of 3 to 500 m, and may have fine irregularities in a surface thereof to increase the adhesion with a positive electrode material. The positive electrode current collector may be used in any of various forms such as a film, a sheet, a foil, a net, a porous material, a foam, a non-woven fabric and the like.

Alternatively, the positive electrode may be produced by laminating, on a positive electrode current collector, a film prepared by casting the positive electrode mixture on a separate support and then removing it from the support.

(2) Negative Electrode

The negative electrode may be used without particular limitation as long as it is one that is typically used in a lithium secondary battery, and may include, for example, a negative electrode current collector and a negative electrode active material layer disposed on the negative electrode current collector.

The negative electrode current collector is not particularly limited as long as it does not cause a chemical change in the battery and has high conductivity. For example, copper, stainless steel, aluminum, nickel, titanium, calcined carbon, or copper or stainless steel whose surface has been treated with carbon, nickel, titanium, silver or the like, an aluminum-cadmium alloy or the like may be used. In addition, the negative electrode current collector may typically have a thickness of 3 µm to 500 µm, and like the positive electrode current collector, may have fine irregularities in a surface thereof to increase the adhesion with a negative electrode active material. The negative electrode current collector may be used in any of various forms such as a film, a sheet, a foil, a net, a porous material, a foam, a non-woven fabric and the like.

The negative electrode active material layer may include an optional binder and an optional conductive material in addition to the negative electrode active material.

As the negative electrode active material, any of various negative electrode active materials used in the art may be used without particular limitation. Specific examples of the negative electrode active material include: a carbonaceous material such as artificial graphite, natural graphite, graphitized carbon fiber, amorphous carbon or the like; a metallic compound capable of alloying with lithium, such as Si, Al, Sn, Pb, Zn, Bi, In, Mg, Ga, Cd, a Si alloy, a Sn alloy, an Al alloy or the like; a metal oxide capable of doping and dedoping lithium, such as $SiO_y$ ($0<y<2$), $SnO_2$, vanadium oxide or lithium vanadium oxide; a composite including the metallic compound and the carbonaceous material, such as a Si—C composite or a Sn—C composite; and the like, which may be used alone or in combination of two or more thereof. In addition, as the negative electrode active material, a metal lithium thin film may be used.

Meanwhile, the negative electrode active material may be included in an amount of 80 wt % to 99 wt % based on the total weight of the negative electrode active material layer.

The binder is a component that assists the binding among a conductive material, an active material and a current collector, and is typically added in an amount of 0.1 wt % to 10 wt % based on the total weight of the negative electrode active material layer. Examples of such a binder include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, styrene-butadiene rubber, nitrile-butadiene rubber, fluoro-rubber, various copolymers thereof and the like.

The conductive material is a component for further enhancing the conductivity of the negative electrode active material, and may be added in an amount of 10 wt % or less, preferably 5 wt % or less, based on the total weight of the negative electrode active material layer. Such a conductive material is not particularly limited as long as it does not cause a chemical change in the battery and has conductivity, and examples of a material usable as the conductive material include: graphite such as natural graphite, artificial graphite or the like; carbon black such as acetylene black, Ketjen black, channel black, furnace black, lamp black, thermal black or the like; a conductive fiber such as carbon fiber, metal fiber or the like; a metal powder such as carbon fluoride powder, aluminum powder, nickel powder or the like; a conductive whisker such as zinc oxide, potassium titanate or the like; a conductive metal oxide such as titanium oxide or the like; and a conductive material such as a polyphenylene derivative or the like.

The negative electrode active material layer may be prepared by applying a composition for forming a negative electrode active material layer, which is prepared by dissolving or dispersing a negative electrode active material, an optional binder and an optional conductive material in a solvent, onto a negative electrode current collector and then carrying out drying, or by laminating, on a negative electrode current collector, a film prepared by casting the composition for forming a negative electrode active material layer on a separate support and then removing it from the support.

(3) Separator

The separator is interposed between the negative electrode and the positive electrode, separating the positive electrode and the negative electrode and providing a passage for lithium ion migration. As the separator, a separator commonly used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, an ethylene/methacrylate copolymer or the like or a stacked structure having two or more layers thereof, may be used. In addition, a common porous non-woven fabric, for example, a non-woven fabric made of high-melting-point glass fiber, polyethylene terephthalate fiber or the like may be used. Also, in order to ensure heat resistance or mechanical strength, a coated separator which includes a ceramic component or polymer material and is optionally in a single-layer or multi-layer structure may be used.

(4) Electrolyte

As the electrolyte, an organic liquid electrolyte, an inorganic liquid electrolyte, a solid polymer electrolyte, a gel-type polymer electrolyte, an inorganic solid electrolyte, a molten-type inorganic electrolyte or the like that is usable in a lithium secondary battery may be used without particular limitation.

Specifically, the electrolyte may include an organic solvent and a lithium salt.

As the organic solvent, a solvent which may function as a medium through which ions involved in an electrochemical reaction of the battery can migrate may be used without particular limitation. Specifically, the organic solvent may be: an ether-based solvent such as methyl acetate, ethyl acetate, γ-butyrolactone, ε-caprolactone or the like; an ether-based solvent such as dibutyl ether, tetrahydrofuran or the like; a ketone-based solvent such as cyclohexanone or the like; an aromatic hydrocarbon-based solvent such as benzene, fluorobenzene or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC) or the like; an alcohol-based solvent such as ethyl alcohol, isopropyl alcohol or the like; a nitrile such as Ra—CN (Ra is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane.

As the lithium salt, a lithium salt that is conventionally used in an electrolyte for a lithium secondary battery may be used without particular limitation. For example, the lithium salt may be a lithium salt which has $Li^+$ as an cation and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ as an anion. Specifically, the lithium salt may include one or a mixture of two or more selected from the group consisting of LiCl, LiBr, LiI, $LiClO_4$, $LiBF_4$, LiBioClio, $LiPF_6$, $LiCF_3SO_3$, $LiCH_3CO_2$, $LiCF_3CO_2$, $LiAsF_6$, $LiSbF_6$, $LiAlCl_4$, $LiAlO_4$ and $LiCH_3SO_3$, and additionally, an electrolyte salt commonly used in an electrolyte of a lithium secondary battery, such as a lithium imide salt represented as $LiN(SO_2C_2F_5)_2$ (lithium bisperfluoroethanesulfonimide (LiBETI)), $LiN(SO_2F)_2$ (lithium fluorosulfonyl imide (LiFSI)) or $LiN(SO_2CF_3)_2$ (lithium bis(trifluoromethanesulfonimide) (LiTFSI)), may be used without limitation. Specifically, the electrolyte salt may include one or a mixture of two or more selected from the group consisting of $LiPF_6$, $LiBF_4$, $LiCH_3CO_2$, $LiCF_3CO_2$, $LiCH_3SO_3$, LiFSI, LiTFSI and $LiN(C_2F_5SO_2)_2$.

The amount of the lithium salt may be appropriately changed within a range generally available, and may be specifically included in an amount of 0.8 M to 3 M, specifically 0.1 M to 2.5 M, in the electrolyte.

In addition to the above-described electrolyte components, various additives may be used in the electrolyte for the purpose of improving the lifetime characteristics of the battery, suppressing a reduction in battery capacity, improving the discharge capacity of the battery or the like.

As the additive, the following may be used: an imide-based salt such as lithium bis(fluorosulfonyl)imide (LiFSI), lithium bis(trifluoromethylsulfonyl)imide or the like; a borate-based salt such as lithium bis(oxalato)borate (LiBOB), lithium difluoro(oxalato)borate (LiOdFB), tris(trimethylsilyl) borate (TMSB) or the like; a phosphate-based salt such as difluorophosphate or tris(trimethylsilyl) phosphate; a haloalkylene carbonate-based compound such as difluoroethylene carbonate or the like; or pyridine, triethylphosphite, triethanolamine, cyclic ether, ethylenediamine, n-glyme, hexamethylphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride or the like, which may be used alone or in combination. In this case, each of the additives may be included in an amount of 0.1 wt % to 10 wt % based on the total weight of the electrolyte.

The above-described lithium secondary battery of the present invention is useful in the field of portable devices such as mobile phones, notebook computers, digital cameras or the like, electric vehicles such as hybrid electric vehicles (HEVs), and the like.

The type of the lithium secondary battery of the present invention may be, but is not particularly limited to, a cylindrical type using a can, a prismatic type, a pouch type, a coin type or the like.

The lithium secondary battery of the present invention may be used not only in a battery cell used as a power source of a small device but also preferably as a unit battery in medium-to-large-sized battery modules including a plurality of battery cells.

MODES OF THE INVENTION

Hereinafter, the present invention will be described in more detail by way of specific examples.

Example 1

A lithium composite transition metal oxide doped with Ti and W was prepared by dry-mixing $Ni_{0.90}Co_{0.08}Mn_{0.02}(OH)_2$, LiOH, $TiO_2$ and $WO_3$ and firing the mixture at 760° C. for 12 hours. In this case, the $TiO_2$ and the $WO_3$ were used in an amount such that Ti and W reached 2,000 ppm and 4,000 ppm, respectively, based on the total lithium composite transition metal oxide.

After the lithium composite transition metal oxide prepared as described above was mixed with $H_3BO_3$, the mixture was thermally treated at 350° C. for three hours, and thereby a lithium composite transition metal oxide (A) having a coating layer containing B was prepared.

The lithium composite transition metal oxide (A) prepared as described above was mixed with a carbon black conductive material and a PVdF binder at a weight ratio of 96.5:1.5:2.0 in an N-methylpyrrolidone solvent to prepare a positive electrode mixture, which was subsequently applied to one surface of an aluminum current collector, dried at 130° C., and then rolled to produce a positive electrode.

A porous polyethylene separator was interposed between the positive electrode produced as described above and a negative electrode, and thereby an electrode assembly was produced. After the electrode assembly was placed in a case, an electrolyte was injected into the case, and thereby a lithium secondary battery (coin-type half-cell) was produced.

In this case, a lithium metal was used as the negative electrode, and an electrolyte which was prepared by dissolving lithium hexafluorophosphate ($LiFP_6$) at a concentration of 1 M in an organic solvent consisting of ethylene carbonate, dimethyl carbonate, and ethyl methyl carbonate mixed at a volume ratio of 3:4:3 was used as the electrolyte.

Comparative Example 1

A lithium composite transition metal oxide powder doped with Al and Zr was prepared by dry-mixing $Ni_{0.90}Co_{0.08}Mn_{0.02}(OH)_2$, LiOH, $ZrO_2$ and $Al(OH)_3$ and firing the mixture at 760° C. for 12 hours. In this case, the $ZrO_2$ and the $Al(OH)_3$ were used in an amount such that Zr and Al reached 2,000 ppm and 2,800 ppm, respectively, based on the total lithium composite transition metal oxide.

After the lithium composite transition metal oxide prepared as described above was mixed with $H_3BO_3$, the mixture was thermally treated at 350° C. for three hours, and thereby a lithium composite transition metal oxide (B) having a surface coating layer containing B was prepared.

A lithium secondary battery (coin-type half-cell) was produced in the same manner as in Example 1 except that the lithium composite transition metal oxide (B) prepared as described above was used instead of the lithium composite transition metal oxide (A).

Comparative Example 2

A lithium composite transition metal oxide doped with Al, Zr and W was prepared by dry-mixing $Ni_{0.88}Co_{0.09}$ $Mn_{0.03}(OH)_2$, LiOH, $ZrO_2$, $WO_3$ and $Al(OH)_3$ and firing the mixture at 740° C. for 12 hours. In this case, the $ZrO_2$, the $WO_3$ and the $Al(OH)_3$ were used in an amount such that Zr, W and Al reached 2,000 ppm, 2,000 ppm and 1,400 ppm, respectively, based on the total lithium composite transition metal oxide.

After the lithium composite transition metal oxide prepared as described above was mixed with $H_3BO_3$, the mixture was thermally treated at 350° C. for three hours, and thereby a lithium composite transition metal oxide (C) having a surface coating layer containing B was prepared.

A lithium secondary battery (coin-type half-cell) was produced in the same manner as in Example 1 except that the lithium composite transition metal oxide (C) prepared as described above was used instead of the lithium composite transition metal oxide (A).

Comparative Example 3

A lithium composite transition metal oxide doped with Al, Zr and W was prepared by dry-mixing $Ni_{0.90}Co_{0.08}Mn_{0.02}(OH)_2$, LiOH, $ZrO_2$, $WO_3$ and $Al(OH)_3$ and firing the mixture at 760° C. for 12 hours. In this case, the $ZrO_2$, the $WO_3$ and the $Al(OH)_3$ were used in an amount such that Zr, W and Al reached 2,000 ppm, 2,000 ppm and 1,400 ppm, respectively, based on the total lithium composite transition metal oxide.

After the lithium composite transition metal oxide prepared as described above was mixed with $H_3BO_3$, the mixture was thermally treated at 350° C. for three hours, and thereby a lithium composite transition metal oxide (D) having a surface coating layer containing B was prepared.

A lithium secondary battery (coin-type half-cell) was produced in the same manner as in Example 1 except that the lithium composite transition metal oxide (D) prepared as described above was used instead of the lithium composite transition metal oxide (A).

Experimental Example 1: Analysis of Crystal Structure

At room temperature (25° C.), each of the lithium secondary batteries of Example 1 and Comparative Examples 1 to 3 was charged at a constant current of 0.2 C until a full charged state of 4.25 V was reached, under a condition of 0.005 C cut off. After subsequently separating a positive electrode from the lithium secondary battery, a positive electrode active material layer was scraped off therefrom, and thereby a positive electrode active material sample was collected. The collected sample was placed in a radiation accelerator equipped with an in-situ high-temperature XRD instrument and analyzed by XRD, and based on the obtained data, a change in the crystal structure and a, c parameter of each sample according to temperature were determined.

The measurement results are shown in FIGS. 1 and 2. FIG. 1 is a graph illustrating a change in the crystal structure of each sample according to temperature, and FIG. 2 is a graph illustrating the c parameter of each sample according to temperature.

As illustrated in FIG. 1, in a fully charged state, the positive electrode active material of Example 1 underwent a phase transformation from a layered structure to a spinel structure at a temperature of 308° C., and the positive electrode active materials of Comparative Examples 1 to 3 underwent a phase transformation at 274° C., 279° C. and 288° C., respectively.

In addition, as illustrated in FIG. 2, the positive electrode active material of Example 1 underwent a rapid change in c parameter at a temperature of 220° C. or more and the c parameter thereof reached a maximum at a temperature near 300° C., whereas the positive electrode active materials of Comparative Examples 1 to 3 underwent a rapid change in c parameter at a relatively low temperature of 200° C. or more as compared with Example 1 and the c parameter thereof reached a maximum at a temperature near 220 to 250° C.

Experimental Example 2: Evaluation of Initial Capacity Characteristics

The initial capacity characteristics of the lithium secondary batteries of Example 1 and Comparative Examples 1 to 3 were evaluated by the following method:

At room temperature (25° C.), each of the lithium secondary batteries was charged at a constant current of 0.2 C until 4.25 V was reached, under a condition of 0.005 C cut off, and was maintained for 20 minutes. Subsequently, a charge capacity thereof was measured. The measurement results are shown in FIG. 3 and the following Table 1.

TABLE 1

|  | Charge capacity (mAh/g) |
| --- | --- |
| Example 1 | 231.44 |
| Comparative Example 1 | 229.90 |
| Comparative Example 2 | 225.91 |
| Comparative Example 3 | 230.61 |

As shown in Table 1 and FIG. 3, despite the use of a positive electrode active material having a higher doping-element content than Comparative Examples 1 to 3, Example 1 exhibited superior capacity characteristics compared to Comparative Examples 1 to 3.

Experimental Example 3: Evaluation of High-Temperature Characteristics

The high-temperature lifetime characteristics of the lithium secondary batteries of Example 1 and Comparative Examples 1 to 3 were evaluated by the following method:

At an elevated temperature (45° C.), each of the lithium secondary batteries was charged in the CC/CV mode of 0.3 C until 4.25 V was reached, and was discharged at a constant current of 0.3 C until 2.5 V was reached. After 30 cycles of the charging and discharging were carried out, a capacity retention rate and a resistance increase rate were measured. Here, the capacity retention rate is a value calculated according to (discharge capacity after 30 cycles/discharge capacity after 1 cycle)×100, and the resistance increase rate is obtained by comparing, with initial resistance, a value obtained by dividing a voltage change rate measured during the first 60-second period after application of current at the $30^{th}$ cycle discharge by the applied current.

The measurement results are shown in the following Table 2.

TABLE 2

| | Example 1 | Comparative Example 1 | Comparative Example 2 | Comparative Example 3 |
|---|---|---|---|---|
| High-temperature lifetime characteristic: capacity retention rate (% @30 Cycle) | 94 | 90 | 90 | 89 |
| High-temperature lifetime characteristic: resistance increase rate (% @30 Cycle) | 177 | 235 | 230 | 280 |

As shown in Table 2, the lithium secondary battery of Example 1, in which a positive electrode active material having a phase transformation temperature of 300° C. or more in a fully charged state was used, exhibited a higher high-temperature capacity retention rate and a significantly lower resistance increase rate than the secondary batteries of Comparative Examples 1 to 3.

The invention claimed is:

1. A lithium secondary battery comprising:
a positive electrode;
a negative electrode;
a separator interposed between the positive electrode and the negative electrode; and
an electrolyte,
wherein the positive electrode includes, as a positive electrode active material, a lithium composite transition metal oxide which has a layered structure,
wherein the lithium composite transition metal oxide is represented by Chemical Formula 1:

$Li_x[Ni_aCo_bMn_cM_d]O_2$   [Chemical Formula 1]

wherein, in Chemical Formula 1,
M includes a first doping element and a second doping element,
wherein the first doping element includes Ti and one or more elements selected from the group consisting of Cr, V, Fe, Zn, Cu and Mg, and
the second doping element includes W and one or more elements selected from the group consisting of Nb, Ta, and Mo, and
$0.98 \leq x \leq 1.2$, $0.85 \leq a \leq 0.95$, $0 \leq b < 0.15$, $0 < c < 0.15$, and $0 < d < 0.15$, and
wherein the first doping element is included in an amount of 1,000 ppm to 3,000 ppm based on a total weight of the lithium composite transition metal oxide,
wherein the second doping element is included in an amount of 1,000 ppm to 5,000 ppm based on a total weight of the lithium composite transition metal oxide,
wherein the lithium composite transition metal oxide includes, on a surface thereof, a coating layer including one or more elements selected from the group consisting of Al, Ti, W, B, F, P, Mg, Ni, Co, Fe, Cr, V, Cu, Ca, Zn, Zr, Nb, Mo, Sr, Sb, Bi, Si and S,
wherein the positive electrode active material has a phase-transform temperature of 300° C. or more, wherein the phase-transform temperature is a temperature at which the layered structure is changed to a spinel structure in a fully charged state.

2. The lithium secondary battery of claim 1, wherein a c parameter of the positive electrode active material, which is measured while raising a temperature to 350° C. in a fully charged state, reaches a maximum at a temperature of 280° C. to 320° C.

3. A positive electrode active material for a lithium secondary battery, the positive electrode active material comprising a lithium composite transition metal oxide having a layered structure, wherein the positive electrode active material has a phase-transform temperature of 300° C. or more, the phase-transform temperature is a temperature at which the layered structure is changed to a spinel structure in a fully charged state,
wherein the lithium composite transition metal oxide is represented by Chemical Formula 1:

$Li_x[Ni_aCo_bMn_cM_d]O_2$   [Chemical Formula 1]

wherein, in Chemical Formula 1,
M includes a first doping element and a second doping element,
wherein the first doping element includes Ti and one or more elements selected from the group consisting of Cr, V, Fe, Zn, Cu and Mg, and
the second doping element includes W and one or more elements selected from the group consisting of Nb, Ta, and Mo, and
$0.98 \leq x \leq 1.2$, $0.85 \leq a \leq 0.95$, $0 \leq b < 0.15$, $0 < c < 0.15$, and $0 < d < 0.15$,
wherein the first doping element is included in an amount of 1,000 ppm to 3,000 ppm based on a total weight of the lithium composite transition metal oxide,
wherein the second doping element is included in an amount of 1,000 ppm to 5,000 ppm based on a total weight of the lithium composite transition metal oxide, and
wherein the lithium composite transition metal oxide includes, on a surface thereof, a coating layer including one or more elements selected from the group consisting of Al, Ti, W, B, F, P, Mg, Ni, Co, Fe, Cr, V, Cu, Ca, Zn, Zr, Nb, Mo, Sr, Sb, Bi, Si and S.

* * * * *